United States Patent
Ahmed et al.

(10) Patent No.: US 10,530,254 B2
(45) Date of Patent: Jan. 7, 2020

(54) PEAK-DELIVERED-POWER CIRCUIT FOR A VOLTAGE REGULATOR

(71) Applicant: INTEL CORPORATION, Santa Clara, CA (US)

(72) Inventors: Khondker Ahmed, Hillsboro, OR (US); Vivek De, Beaverton, OR (US); Nachiket Desai, Portland, OR (US); Suhwan Kim, Hillsboro, OR (US); Harish Krishnamurthy, Hillsboro, OR (US); Xiaosen Liu, Portland, OR (US); Turbo Majumder, Portland, OR (US); Krishnan Ravichandran, Saratoga, CA (US); Christopher Schaef, Lebanon, NH (US); Vaibhav Vaidya, Portland, OR (US); Sriram Vangal, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 106 days.

(21) Appl. No.: 15/632,086

(22) Filed: Jun. 23, 2017

(65) Prior Publication Data
US 2018/0375433 A1 Dec. 27, 2018

(51) Int. Cl.
*H02M 3/158* (2006.01)
*H02M 1/08* (2006.01)
*H02M 1/00* (2006.01)

(52) U.S. Cl.
CPC .......... *H02M 3/1582* (2013.01); *H02M 1/08* (2013.01); *H02M 2001/0009* (2013.01); *H02M 2001/0025* (2013.01)

(58) Field of Classification Search
None
See application file for complete search history.

(56) References Cited

U.S. PATENT DOCUMENTS

| 7,521,913 | B2* | 4/2009 | Tang | H02M 3/1584 |
|---|---|---|---|---|
| | | | | 323/272 |
| 8,624,570 | B2* | 1/2014 | O'Gorman | H02M 3/33515 |
| | | | | 323/283 |

(Continued)

FOREIGN PATENT DOCUMENTS

CN 203883728 U 10/2014

OTHER PUBLICATIONS

Choi, et al., "Maximum Power Point Tracking", Submitted to the Faculty of the Worcester Polytechnic Institute in partial fulfillment of the requirements for the Degree of B.S. (https://web.wpi.edu/Pubs/E-project/Available/E-project-032317-080235/unrestricted/Maximum_Power_Point_Tracking.pdf), Mar. 23, 2017, 75 pages.

(Continued)

*Primary Examiner* — Jue Zhang
*Assistant Examiner* — Henry E Lee, III
(74) *Attorney, Agent, or Firm* — Stoel Rives LLP (57) ABSTRACT

Embodiments described herein concern operating a peak-delivered-power (PDP) controller. Operating a PDP includes calculating the new power output value from the output voltage value and the output current value, determining whether the new power output value is greater than the previous power output value to determine whether the voltage regulator is outputting a maximum power output, based on a determination that the new power output value is greater than the previous power output value, providing an instruction to a duty generator to increase a duty cycle of the voltage regulator, based on a determination that the new power output value is not greater than the previous power output value, providing an instruction to the duty generator to decrease the duty cycle of the voltage regulator, and replacing the previous power output value with the new power output value.

20 Claims, 9 Drawing Sheets

(56) References Cited

U.S. PATENT DOCUMENTS

| | | |
|---|---|---|
| 2009/0284998 A1 | 11/2009 | Zhang et al. |
| 2012/0161526 A1 | 6/2012 | Huang et al. |
| 2014/0054969 A1 | 2/2014 | Beijer et al. |
| 2014/0184137 A1* | 7/2014 | Huang .................... H02J 3/385 |
| | | 320/101 |
| 2016/0172855 A1* | 6/2016 | Cardillo .................... G05F 1/66 |
| | | 700/298 |

OTHER PUBLICATIONS

PCT/US2018/031397, International Search Report and Written Opinion, dated Nov. 15, 2018, 13 pages.

* cited by examiner

PEAK-DELIVERED-POWER CIRCUIT FOR A VOLTAGE REGULATOR

TECHNICAL FIELD

The present disclosure relates to peak-delivered-power circuitry for a voltage regulator. In particular, the present disclosure relates to peak-delivered-power point tracking circuitry for an inductive voltage regulator.

DETAILED DESCRIPTION OF PREFERRED EMBODIMENTS

Apparatuses, methods, and storage medium associated with peak-delivered-power point tracking circuitry for a voltage regulator are disclosed herein. A number of embodiments are also associated with maximum power harvesting, using a voltage regulator, from energy harvesting transducers. In some examples, the maximum power harvested is defined within a tolerance.

A voltage regulator can include a number of different types of voltage regulators. The examples provided herein describe the voltage regulator as an inductive voltage regulator. However, the examples described herein are not to be limited to an inductive voltage regulator but can include different voltage regulators such as a switched capacitor voltage regulator. In some examples, a voltage regulator can regulate the voltage generated by the energy harvesting transducers. The voltage regulator can be controlled by a control circuitry. The control circuitry can monitor the power output of the voltage regulator. The power output is provided to an output capacitor. The control circuitry autonomously tracks a peak point of a delivered power profile of the energy harvesting transducers. The control circuitry operates the voltage regulator to the vicinity of the peak operating point. The vicinity of the peak operating point is provided as a tolerance of the peak operating point.

As used herein, the voltage regulator maintains a constant voltage. The voltage regulator can provide power to a power supply. The voltage regulator can provide AC voltage or DC voltage. For example, the voltage regulator can provide DC voltages to one or more processors and/or other components of a computing device. The voltage regulator can comprise electromechanical mechanisms and/or electronic components. The output capacitor can store electronic energy. For example, the output capacitor stores energy in an electrical field and/or in a different component of the output capacitor. In some examples, the output capacitor can be a battery. The energy harvesting transducer converts energy from a first form to a second form. For example, the energy harvesting transducer can convert a first signal in one form of energy to a second signal in a different form of energy.

Existing inductive maximum power point tracking (MPPT) circuitry offers the tracking of power at the input of a regulator which does not include the regulator loss. The MPPT circuitry does not maximize the delivered power at the output capacitor at all conditions.

A number of embodiments include calculating the output power being delivered by the voltage regulator. The calculated output power is compared against the previous output power calculation. If the calculated output power is greater than the previous output power, the duty cycle of the voltage regulator is increased. If the calculated output power is smaller than the previous output power, the duty cycle is decreased. A number of embodiments can identify a global maximum point of the output delivered power and can maintain the voltage regulator at an operating point to deliver a maximum harvested power to the output capacitor. The embodiments described herein have the benefit of tracking and maximizing the output power of the voltage regulator as opposed to the input power of the voltage regulator.

Figure 1:
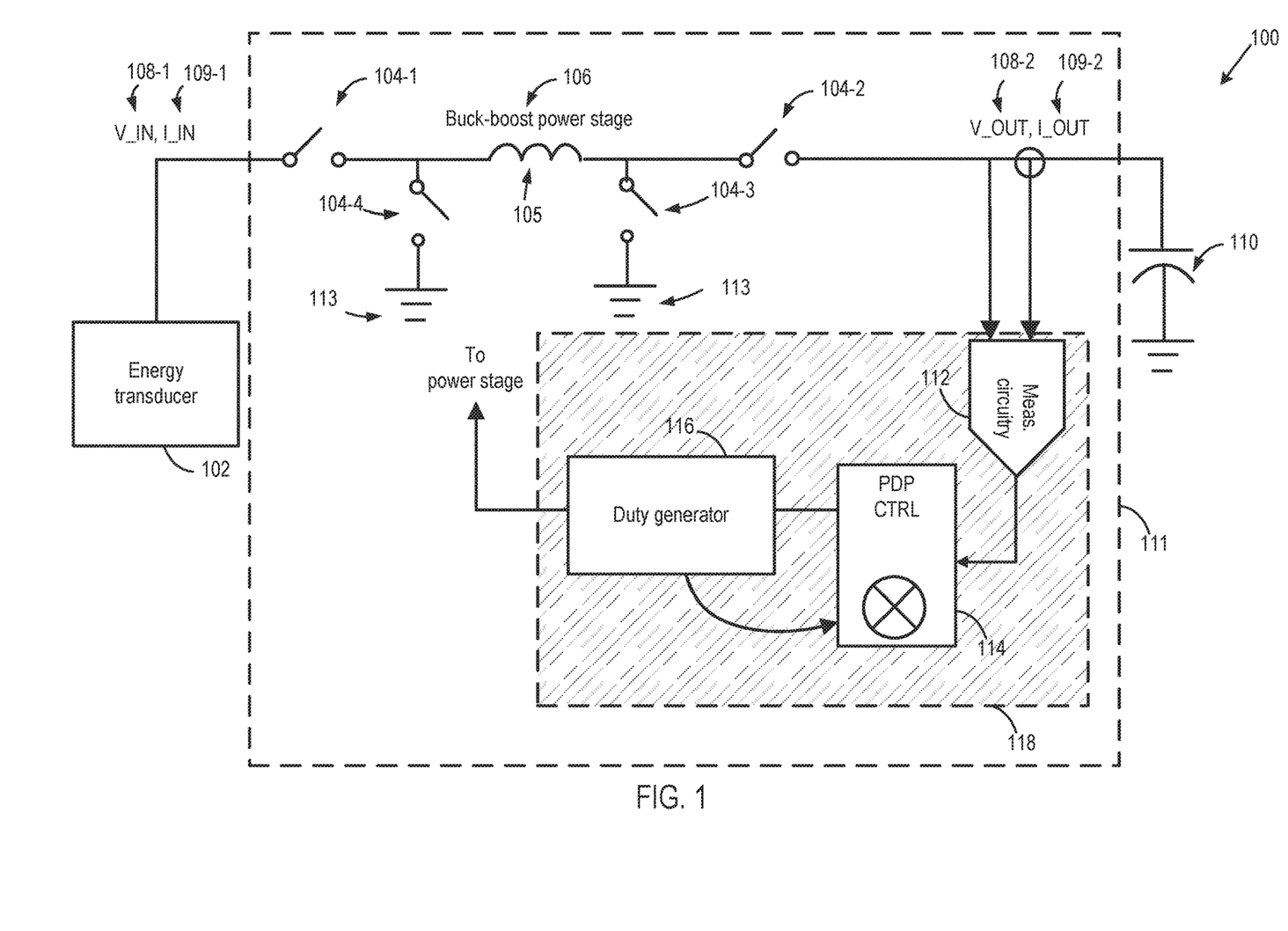
FIG. 1 is a block diagram illustrating a power system according to various embodiments.

FIG. 1 is a block diagram illustrating a power system 100, according to various embodiments. The power system 100 includes an energy transducer 102, an output capacitor 110, and a voltage regulator 111. The voltage regulator 111 includes a buck-boost power stage 106, switches 104-1 to 104-4, and control circuitry 118. The switches 104-1 to 104-4 are referred to herein as switches 104 and/or a switch matrix 104. The control circuitry 118 comprises measurement circuitry 112, a peak-delivered-power (PDP) controller 114, and a duty generator 116.

As shown, the voltage regulator 111 is an inductive voltage regulator and includes an inductor 105 in the buck-boost power stage 106. The inductor 105 store electrical energy in a magnetic field when electrical current flows through the inductor 105.

The buck-boost power stage 106 comprises the switch matrix 104 and the inductor 105. The switch matrix 104 controls the storage of energy and the discharge of stored energy in the inductor 105. The buck-boost power stage 106 is coupled to an electrical ground 113.

Although the buck-boost power stage 106 is shown, the voltage regulator 111 can include a buck power stage or a boost power stage instead of the buck-boost power stage 106. The buck-boost power stage 106 operates in either a buck mode or a boost mode. A buck power stage operates in a buck mode, while a boost power stage operates in a boost mode. A buck mode can step down a voltage from an input voltage (V_IN) 108-1 to an output voltage (V_OUT) 108-2 while stepping up a current from an input current (I_IN) 109-1 to an output current (I_OUT) 109-2. A boost mode can step up a voltage from the input voltage 108-1 to the output voltage 108-2 while stepping down the current from the input current 109-1 to the output current 109-2.

The switches 104 can be composed of p-channel metal oxide semiconductor (PMOS) transistors and/or complementary metal oxide semiconductor (CMOS) transistors. The switches 104 can be configured to make or break an electrical circuit to interrupt the current or divert the current from one conductor to another.

The energy transducer 102 provides electrical energy which is represented in the power system 100 as the input voltage 108-1 and the input current 109-1. The input voltage 108-1 and the input current 109-1 are outputted from the energy transducer 102 and inputted to the buck-boost power stage 106.

The buck-boost power stage 106 provides electrical energy which is represented in the power system 100 as the output voltage 108-2 and the output current 109-2. The output voltage 108-2 and the output current 109-2 are outputted from the energy transducer buck-boost power stage 106 and inputted to the output capacitor 110.

The measurement circuitry 112 can also receive and/or intercept the output voltage 108-2 and the output current 109-2. The measurement circuitry 112 can measure the output voltage 108-2 and/or the output current 109-2 in analog form or digital form. For example, the measurement circuitry 112 can measure an analog signal or a digital signal. The measurement circuitry 112 can be an analog-to-digital converter (ADC) among other types of measurement circuitry. In some examples, the measurement circuitry 112 can be independent of the ADC. For example, the ADC can convert an analog signal to a digital signal. The digital signal can then be measured by the measurement circuitry. In other examples, the ADC can convert the analog signal to a digital signal and measure the digital signal as part of the measurement circuitry 112.

Said another way, the control circuitry 118 can sample the output voltage 108-2 and the output current 109-2 through the measurement circuitry 112. An output voltage value and an output current value corresponding to the output voltage 108-2 and the output current 109-2, respectively, are provided to the PDP controller 114. The PDP controller 114 calculates an output power value from the output voltage value and the output voltage value. The PDP controller 114 also compares the output power value to a previous output power value to determine whether to increase or decrease the duty cycle of the voltage regulator 111 so as to track and operate the voltage regulator 111 at the peak delivered power point.

The control circuitry 118 updates the duty cycle of the voltage regulator 111 through the duty generator 116. The duty generator can comprise circuitry to generate and/or update a duty cycle.

Figure 2:
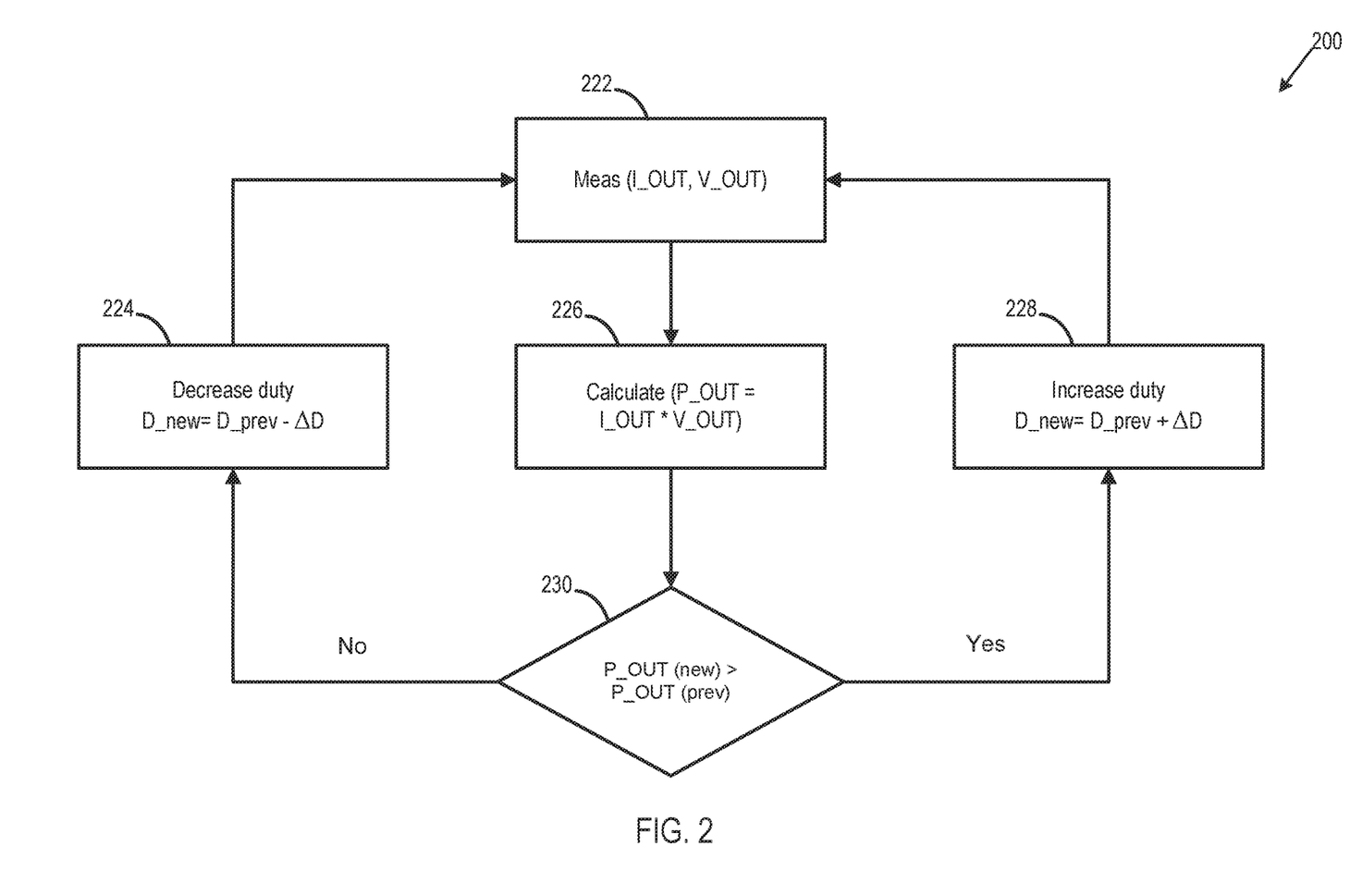
FIG. 2 is a flow diagram illustrating updating a duty cycle according to various embodiments.

FIG. 2 is a flow diagram 200 illustrating updating a duty cycle, according to various embodiments. The flow diagram 200 shows a flow of the PDP controller 114 of FIG. 1.

The flow diagram 200 includes measuring 222 the output current and the output voltage. The flow diagram 200 calculates 226 a current output power and compares it with a previous output power. The flow diagram 200 further compares 230 the current output power to the previous output power. If the current output power is greater than the previous output power, the controller increases 228 the duty cycle of the voltage regulator. Since the output voltage is connected to the output capacitor (e.g., to a battery terminal which resembles a large capacitor), the output current increases to compensate for the demand of duty cycle increment, which translates to an increment of the input current and a decrement of the input voltage of the voltage regulator.

When the next measurement 222 is performed with the decreased input voltage, if the newly calculated 226 power is still higher, the duty cycle is increased even further. The flow diagram 200 is repeated continuously until the power system goes over the peak power point and the current measure power is less than the previously measured power, in which case the duty cycle is decreased instead of increased. The successive measurements 222 toggle the voltage regulator over and under the peak power point of the output power provided by the voltage regulator until the peak itself moves to a new location. In case of such move, the control circuitry autonomously tracks the peak power point and re-settles around the new peak.

In FIG. 2, the output power value (P_OUT) is calculated 226 by multiplying the output current value with the output voltage output. In other examples, the output power value can be calculated 226 by performing a different operation, other than a multiplication operation, utilizing the output voltage value and the output current value.

The increase 228 and/or a decrease 224 to the duty cycle can be predetermined and/or determined during each iteration of the flow diagram 200. For example, the increase 228 to the duty cycle can be predetermined, while the decrease 224 to the duty cycle is calculated each time it is determined that the current output power is less than or equal to the previous output power. The increase 228 to the duty cycle can, alternatively, be calculated each time it is determined that the current output power is greater than the previous output power.

The increase 228 and the decrease 224 to the duty cycle are shown in FIG. 2 as ΔD. The current duty cycle and the previous duty cycle are shown as D_new and D_prev, respectively.

In some examples, the increase 228 and the decrease 224 are predefined such that the difference between the current output power and the previous output power is can be used to index a value for the increase 228 and the decrease 224. For example, if the difference between the current output power and the previous output power is X, then a first ΔD is added to or subtracted from the duty cycle to update the duty cycle. If the difference between the current output power and the previous output power is Y, then a second ΔD is added to or subtracted from the duty cycle to update the duty cycle.

Figure 3:
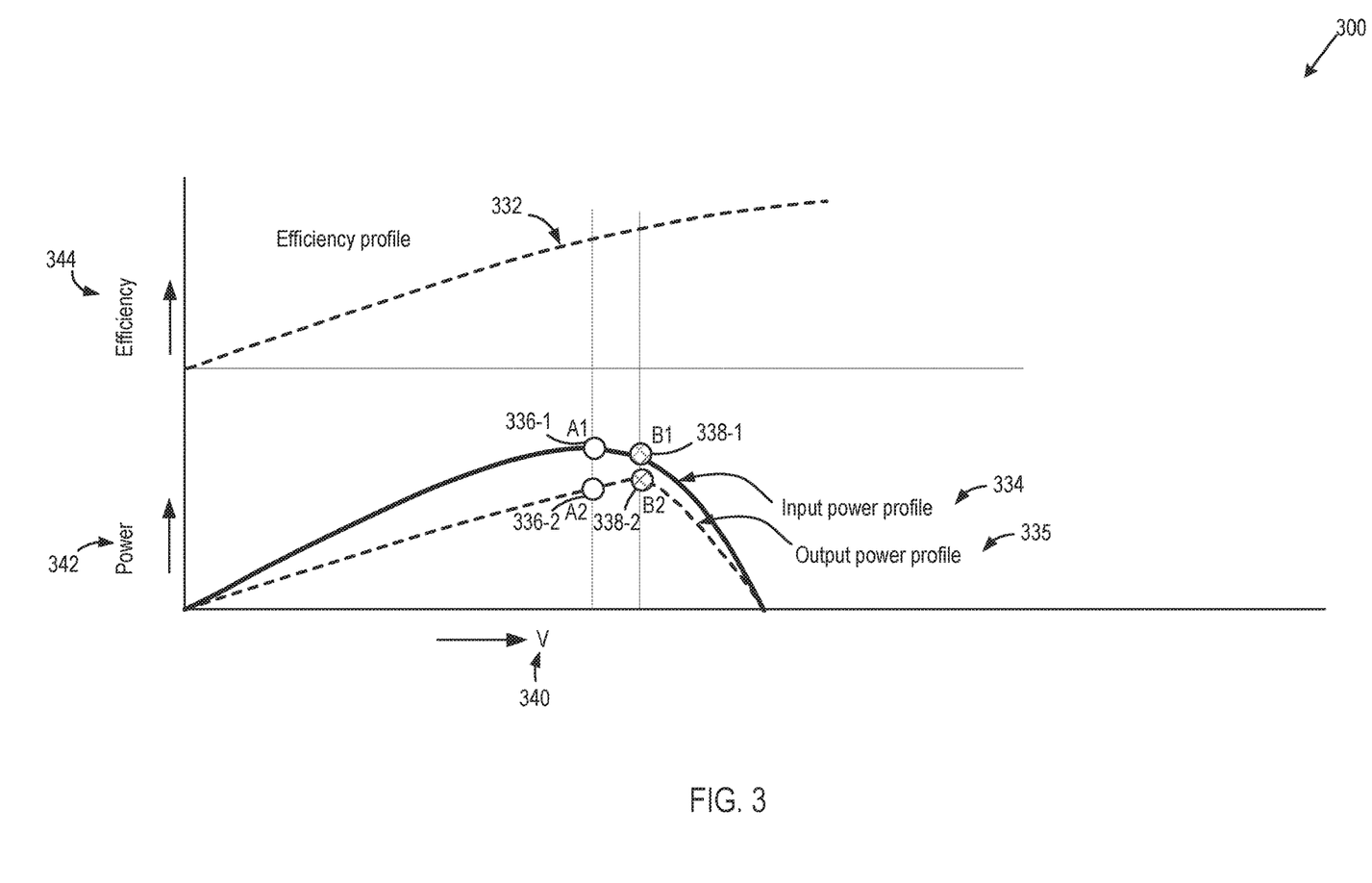
FIGS. 3, 4, and 5 are graphs illustrating a plurality of power peaks according to various embodiments.
Figure 4:
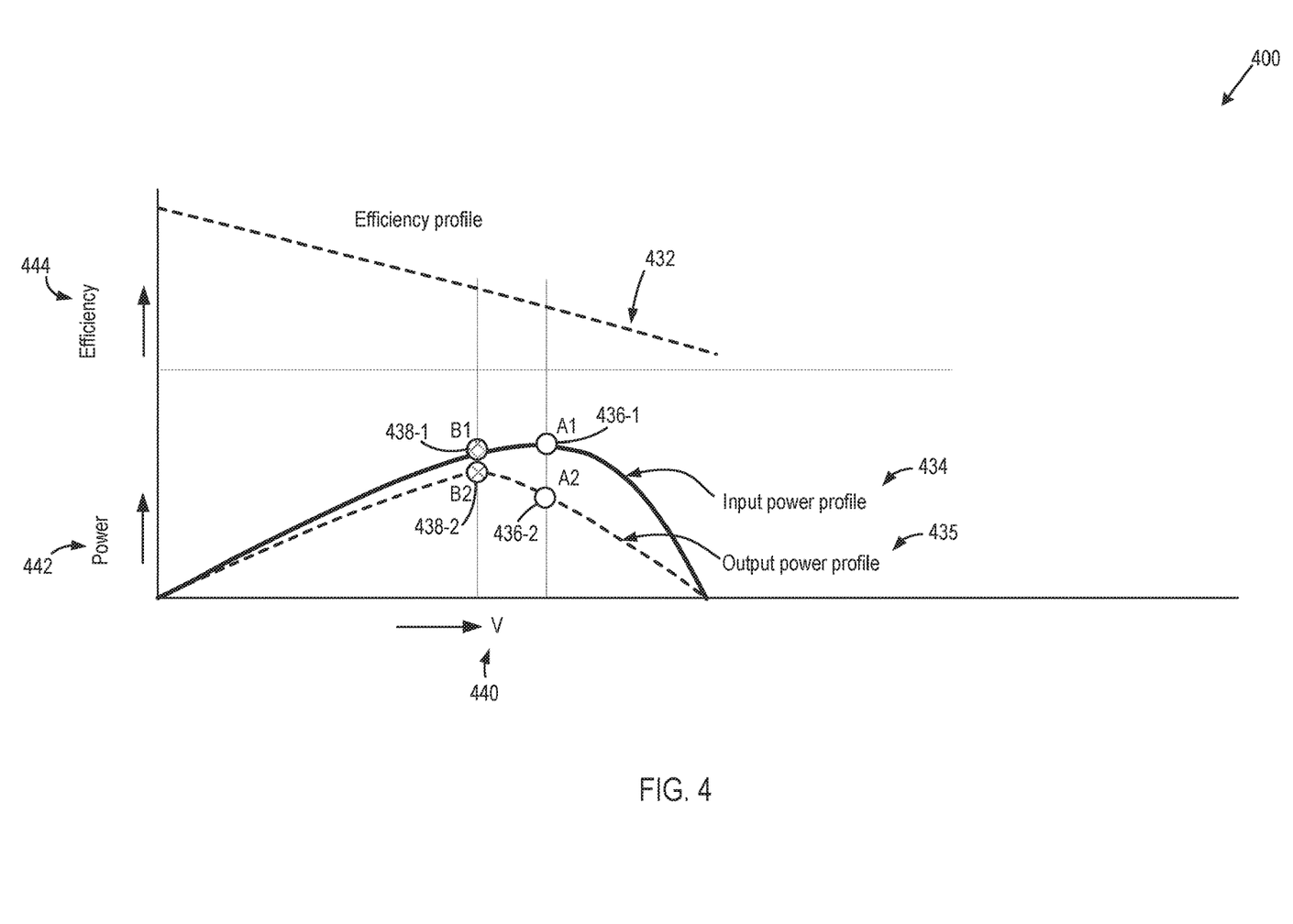
Figure 5:
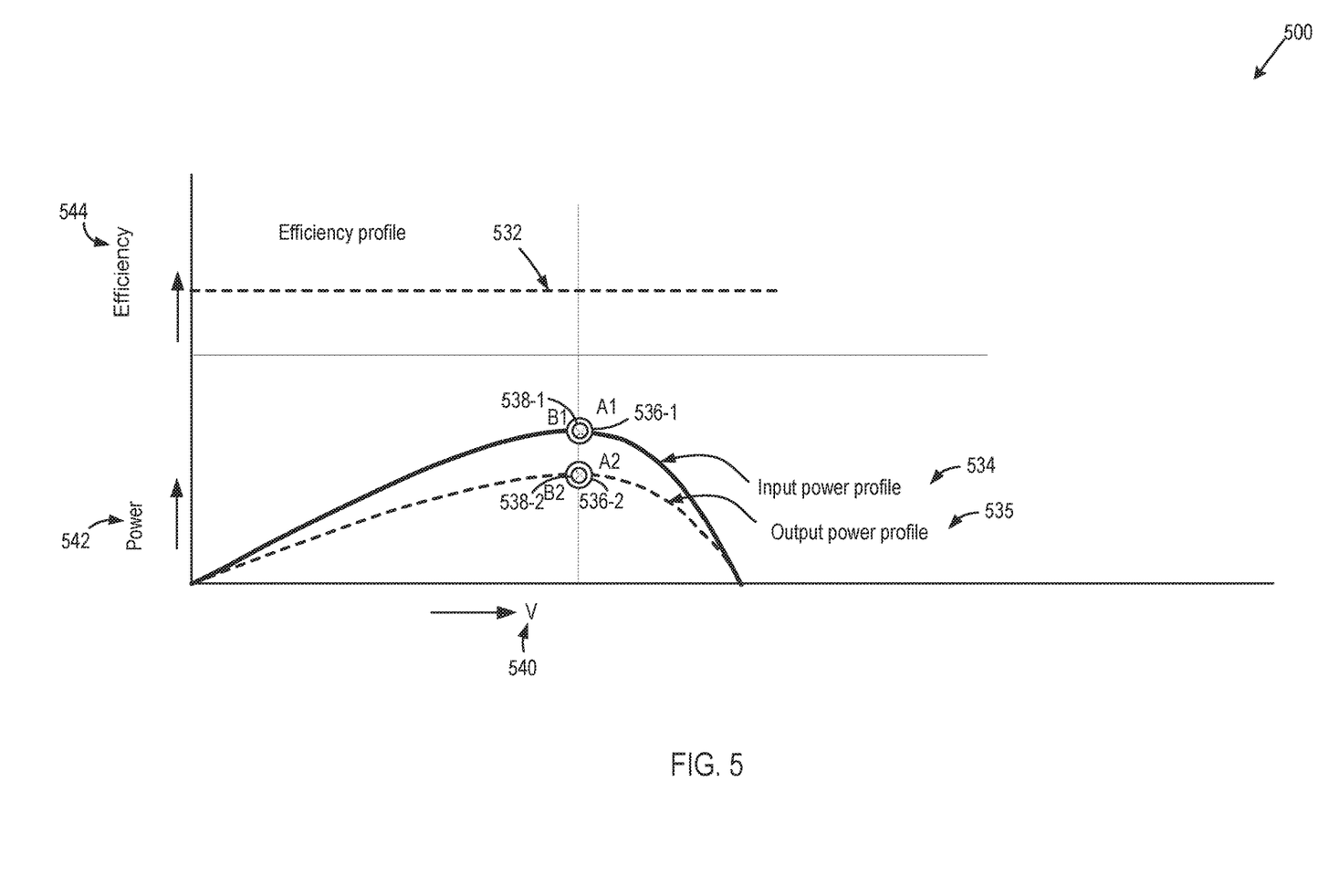

Due to the nature of the voltage regulator described herein, the efficiency profile of the voltage regulator can vary based on the input voltage, the output voltage, the input current, and output current. The efficiency profile of the voltage regulator can affect the output power delivered to the output capacitor. FIGS. 3-5 describe three examples of efficiency profiles of the voltage regulator and how the embodiments described herein improve the output power (e.g., delivered power) in such cases.

FIG. 3 is a graph 300 illustrating a plurality of power peaks, according to various embodiments. The graph 300 includes an x-axis showing a voltage 340 while a y-axis shows a power 342 and an efficiency 344. The graph 300 also shows an efficiency profile 332, an input power profile 334, and an output power profile 335.

The efficiency profile 332 of the voltage regulator is provided in terms of the voltage 340 (e.g., input voltage provided to the voltage regulator) and the efficiency 344 of the voltage regulator. The input power profile 334 describes the voltage 340 (input voltage) and the power 342 provided to the voltage regulator. The output power profile 335 describes the voltage 340 (output voltage) and the power 342 provided by the voltage regulator.

The example shown in FIG. 3 provides an increasing efficiency profile. That is, a voltage regulator may exhibit the efficiency profile 332 which increases the efficiency 344 with the increase of the voltage 340 (e.g., input voltage) provided to the voltage regulator.

The duty cycle of the voltage regulator can be optimized such that the voltage 340 provided to the voltage regulator results in a greatest amount of power 342 provided to the voltage regulator. The input power profile 334 shows the optimization of the duty cycle of a voltage regulator to arrive at a maximum amount of power 342 provided to the voltage regulator.

The duty cycle of the voltage regulator can also be optimized such that the voltage 340 provided to the voltage regulator results in a greater amount of power 342 provided by the voltage regulator. As such, the output power profile 335 shows the optimization of the duty cycle of a voltage regulator to arrive at a maximum amount of power 342 provided by the voltage regulator.

The duty cycle of the voltage regulator can be optimized to identify a maximum power (e.g., a peak power) of the input power profile 334. That is, the input power profile 334 shows that the input power 342 (e.g., power provided to the voltage regulator) peaks at an operating point 336-1 (e.g., operating point A1). However, due to the voltage regulator's loss (e.g., inefficiencies), the actual power that is delivered to the output capacitor is shown at an operating point 336-2 (e.g., operating point A2). At the operating point 336-2, the output power is less than the input power at the operating point 336-1. That is, the output power at the operating point 336-2 is a factor of the input power at the operating point 336-1, and the output power at the operating point 336-2 is less than the input power at the operating point 336-1. For example, the power at the operating point 336-1 can be equal to the power at the operating point 336-2 multiplied by $\eta$, where $\eta$ is the efficiency of the voltage regulator and $\eta$ is greater than one.

In a number of embodiments, the duty cycle of the voltage regulator is optimized to identify a maximum output power of the output power profile 335. That is, the output power profile 335 shows that the output power 342 (e.g., power provided by the voltage regulator) peaks at an operating point 338-2 (e.g., operating point B2). However, the same duty cycle corresponding to the maximum output power provided by the voltage regulator can also correspond to the input power as identified by an operating point 338-1. Given the increased efficiency of the voltage regulator at the operating point 338-2 as compared to the efficiency of the voltage regulator at the operating point 336-2, as shown by the efficiency profile 332, the output power 342 at the operating point 338-2 is greater than the output power 342 at the operating point 336-2 even if the input power 342 at the operating point 336-2 is smaller than the input power 342 at the operating point 338-1.

Optimizing the duty cycle of the voltage regulator to identify the maximum output power provides a greater output power (M1) than the output power (M2) provided by optimizing the duty cycle of the voltage regulator to identify the maximum input power. The increase (N) in output power is equal to M1 minus M2 such that M1=M2+N.

FIG. 4 is a graph 400 illustrating a plurality of power peaks, according to various embodiments. The graph 400 includes an x-axis showing a voltage 440 while a y-axis shows a power 442 and an efficiency 444. The graph 400 also shows an efficiency profile 432, an input power profile 434, and an output power profile 435.

The efficiency profile 432 of the voltage regulator is provided in terms of the voltage 440 (e.g., input voltage provided to the voltage regulator) and the efficiency 444 of the voltage regulator. The input power profile 434 describes the voltage 440 and the power 442 provided to the voltage regulator. The output power profile 435 describes the voltage 440 (output voltage) and the power 442 provided by the voltage regulator.

The example shown in FIG. 4 provides a decreasing efficiency profile. That is, a voltage regulator exhibits an efficiency which decreases with the increase of the voltage 440 provided to the voltage regulator.

The duty cycle of the voltage regulator can be optimized such that the voltage 440 provided to the voltage regulator results in a greatest amount of power 442 provided to the voltage regulator. As such, the input power profile 434 shows the optimization of the duty cycle of a voltage regulator to arrive at a maximum amount of power 442 provided to the voltage regulator.

The duty cycle of the voltage regulator can also be optimized such that the voltage 440 provided to the voltage regulator results in a greater amount of power 442 provided by the voltage regulator. As such, the output power profile 435 shows the optimization of the duty cycle of a voltage regulator to arrive at a maximum amount of power 442 provided by the voltage regulator.

The duty cycle of the voltage regulator can be optimized to identify a maximum power (e.g., a peak power) of the input power profile 434. The input power profile 434 shows that the input power 442 (e.g., power provided to the voltage regulator) peaks at an operating point 436-1 (e.g., operating point A1). However, due to the voltage regulator's loss (e.g., inefficiencies), the actual power that is delivered to the output capacitor is shown at an operating point 436-2 (e.g., operating point A2). At the operating point 436-2, the output power is less than the input power at the operating point 436-1, That is, the output power at the operating point 436-2 is a factor of the input power at the operating point 436-1, and the output power at the operating point 436-2 is less than the input power at the operating point 436-1. For example, the power at the operating point 336-1 can be equal to the power at the operating point 436-2 multiplied by $\eta$, where $\eta$ is the efficiency of the voltage regulator and $\eta$ is greater than one.

In a number of embodiments, the duty cycle of the voltage regulator is optimized to identify a maximum output power of the output power profile 435. The output power profile 435 shows that the output power 442 (e.g., power provided by the voltage regulator) peaks at an operating point 438-2 (e.g., operating point B2). However, the same duty cycle corresponding to the maximum output power provided by the voltage regulator can also correspond to the input power as identified by an operating point 438-1. Given the increased efficiency of the voltage regulator at the operating point 438-2 as compared to the efficiency of the voltage regulator at the operating point 436-2, as shown by the efficiency profile 432, the output power 442 at the operating point 438-2 is greater than the output power 442 at the operating point 436-2 even if the input power 442 at the operating point 436-2 is smaller than the input power 442 at the operating point 438-1.

Optimizing the duty cycle of the voltage regulator to identify the maximum output power provides a greater output power (M1) than the output power (M2) provided by optimizing the duty cycle of the voltage regulator to identify the maximum input power. The increase (N) in output power is equal to M1 minus M2 such that M1=M2+N, as previously described.

FIG. 5 is a graph 500 illustrating a plurality of power peaks, according to various embodiments. The graph 500 includes an x-axis showing a voltage 540 while a y-axis shows a power 542 and an efficiency 544. The graph 500 also shows an efficiency profile 532, an input power profile 534, and an output power profile 535.

The efficiency profile 532 of the voltage regulator is provided in terms of the voltage 540 (e.g., input voltage provided to the voltage regulator) and the efficiency 544 of the voltage regulator. The input power profile 534 describes the voltage 540 (e.g., input voltage) and the power 542 provided to the voltage regulator. The output power profile 535 describes the voltage 540 (e.g., output voltage) and the power 542 provided by the voltage regulator.

The example shown in FIG. 5 provides a flat efficiency profile 532. That is, a voltage regulator of FIG. 5 exhibits an efficiency profile 532 which is invariant with input voltage. Since the efficiency 544 of the efficiency profile 532 does not vary with the input voltage 540, the power 542 provided by the voltage regulator peaks at the same voltage 540 as the power 542 provided to the voltage regulator. As such, optimizing the duty cycle of the voltage regulator can identify a maximum power provided to the voltage regulator and provided by the voltage regulator.

The duty cycle of the voltage regulator can be optimized, with a same result, for the input power or an output power of the voltage regulator. As such, the maximum input power 542 identified by optimizing the duty cycle is provided by operating points 536-1 and 538-1 (e.g., operating points A1 and B1). The maximum output power 542 identified by optimizing the duty cycle is provided by the operating points 536-2 and 538-2 (e.g., operating points A2 and B2).

Figure 6:
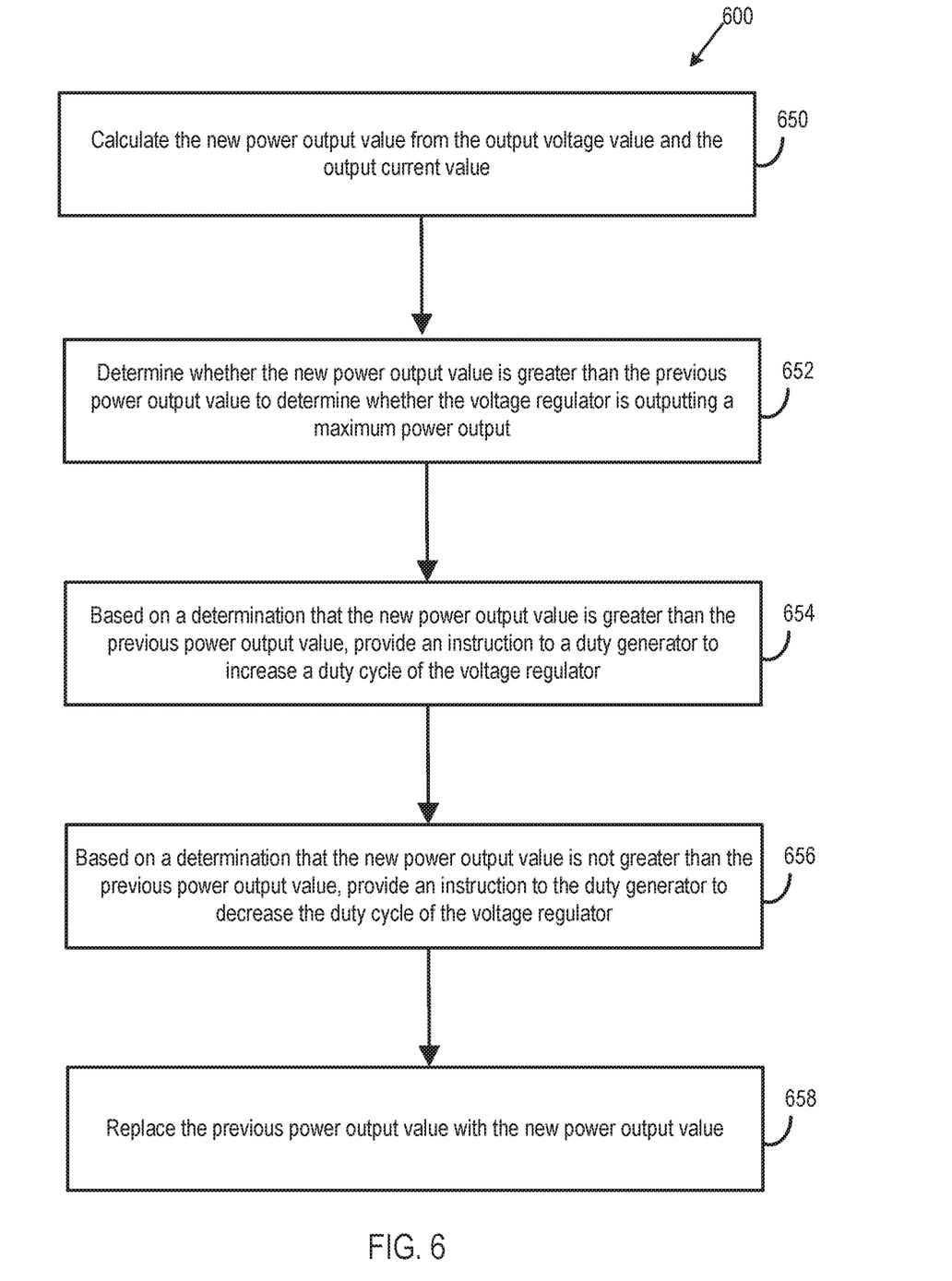
FIGS. 6, 7, and 8 are flow diagrams illustrating methods for operating a peak-delivered-power (PDP) controller according to various embodiments.

FIG. 6 is a flow diagram illustrating a method 600 for operating a PDP controller according to various embodiments. The method 600 comprises calculating 650 the new power output value from the output voltage value and the output current value, determining 652 whether the new power output value is greater than the previous power output value to determine whether the voltage regulator is outputting a maximum power output, based on a determination that the new power output value is greater than the previous power output value, providing 654 an instruction to a duty generator to increase a duty cycle of the voltage regulator, based on a determination that the new power output value is not greater than the previous power output value, providing 656 an instruction to the duty generator to decrease the duty cycle of the voltage regulator, and replacing 658 the previous power output value with the new power output value.

The method 600 can also comprise receiving the output voltage and the output current in a digital format. The output voltage value and the output current value can also be received from an analog-to-digital converter (ADC). In some examples, an output voltage and an output current are received in an analog format. The output voltage and the output current can be received from one of a buck stage, a boost stage, and a buck-boost stage.

Calculating 650 the new power output value further comprises multiplying the output current value by the output voltage value to calculate the new power output value. A multiplication operation used to multiply the output current value by the output voltage value is an analog multiplication operation. In some examples, a multiplication operation used to multiply the output current value by the output voltage value is a digital multiplication operation.

The method 600 may further comprise, based on replacing the previous power output with the new power output, calculating a new power output value from a new output voltage value and a new output current value, determining whether the new power output value is greater than the previous power output value to determine whether the voltage regulator is currently outputting the maximum power output, based on a determination that the new power output value is greater than the previous power output value, providing an indication to the duty generator to increase the duty cycle, based on a determination that the new power output value is not greater than the previous power output value, providing an indication to the duty generator to decrease the duty cycle, and replacing the previous power output value with the new power output value.

Figure 7:
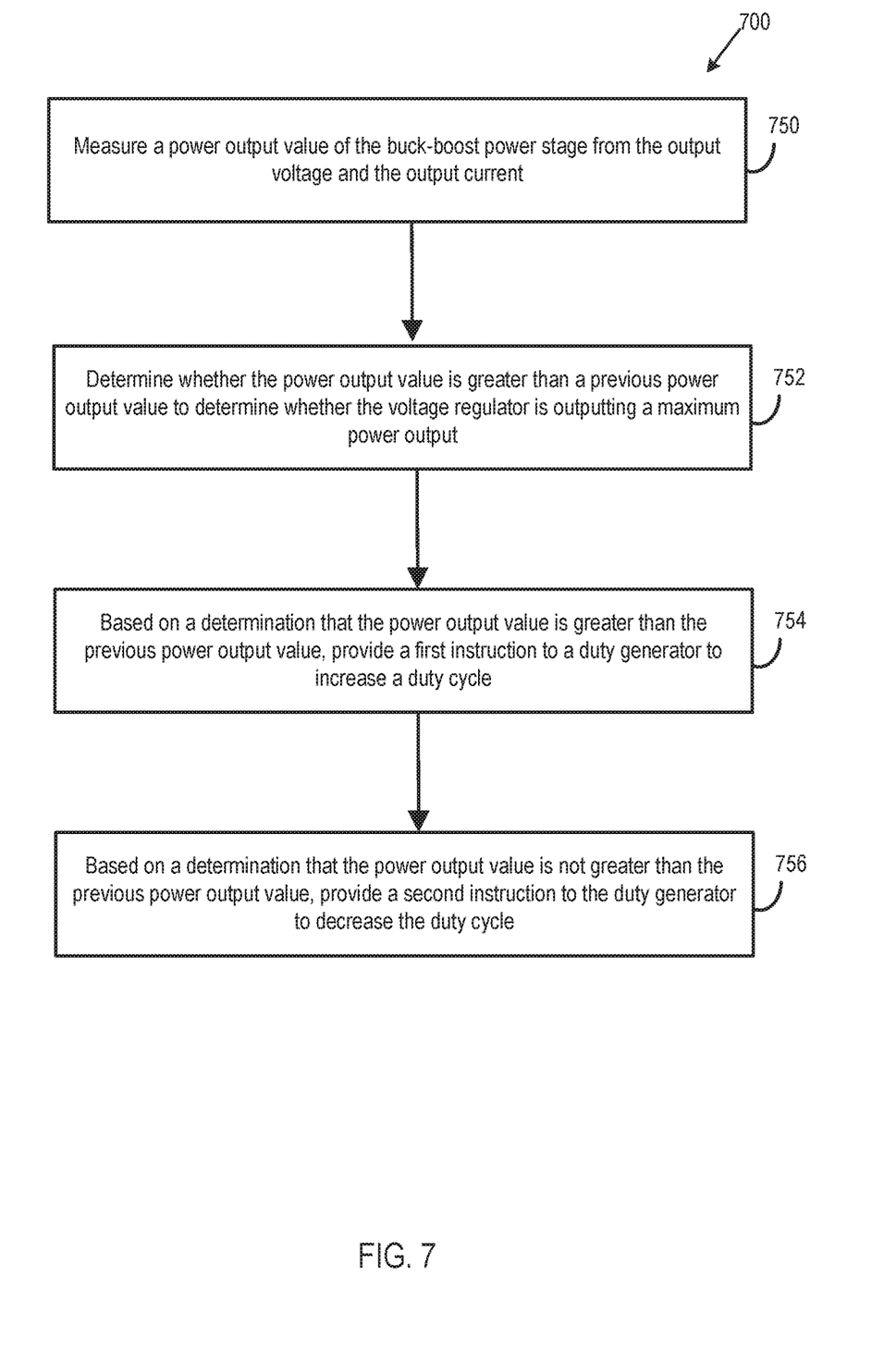

FIG. 7 is a flow diagram illustrating a method 700 for operating a PDP controller according to various embodiments. The method 700 comprises measuring 750 a power output value of the buck-boost power stage from the output voltage and the output current, determining 752 whether the power output value is greater than a previous power output value to determine whether an voltage regulator is outputting a maximum power output, based on a determination that the power output value is greater than the previous power output value, providing 754 a first instruction to a duty generator to increase a duty cycle, and based on a determination that the power output value is not greater than the previous power output value, providing 756 a second instruction to the duty generator to decrease the duty cycle. In some examples, the method can also include, through a duty generator, based on receipt of the first instruction, increasing the duty cycle of the buck-boost power stage by a first delta value and, based on receipt of the second instruction, decreasing the duty cycle of the buck-boost power stage by a second delta value.

The first delta value can be a predetermined first delta value. The duty cycle can be increased by the first delta value that is constant. That is, the first delta value can be a constant and can be predetermined. The second delta value can also be predetermined and can be a constant.

The method 700 can also include increasing the duty cycle by calculating the first delta value based on a difference between the new power output value and the previous power output value. Decreasing the duty cycle can also include calculating the second delta value based on a difference between the new power output value and the previous power output value.

The method 700 further comprises, through an analog-to-digital converter, converting the output voltage and the output current from an analog format to a digital format to generate an output voltage value and an output current value, and providing the output voltage value and the output current value in the digital format to the PDP controller.

Figure 8:
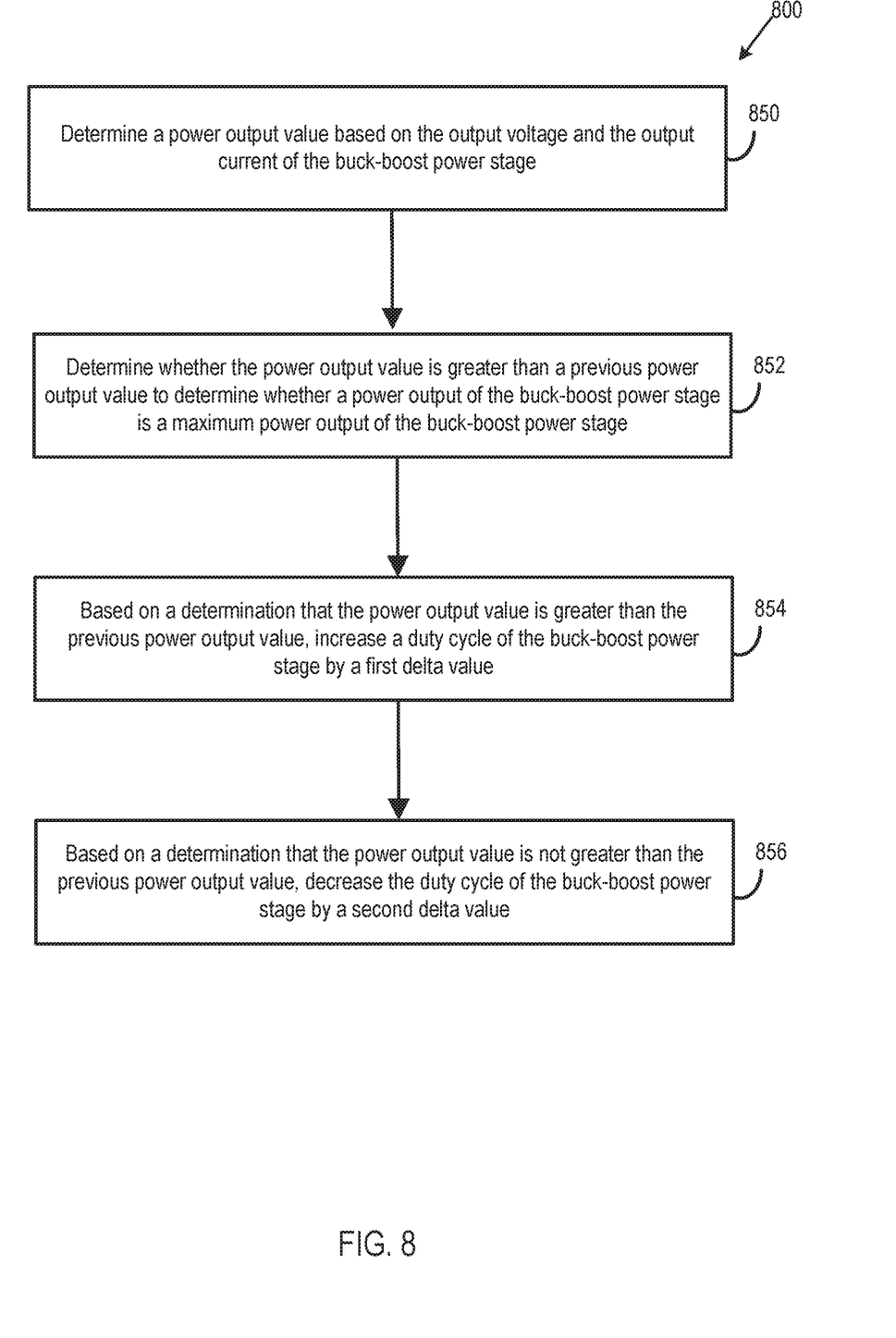

FIG. 8 is a flow diagrams illustrating a method 800 for operating a PDP controller according to various embodiments. The method 800 includes determining 850 a power output value based on the output voltage and the output current of the buck-boost power stage, determining 852 whether the power output value is greater than a previous power output value to determine whether a power output of the buck-boost power stage is a maximum power output of the buck-boost power stage, based on a determination that the power output value is greater than the previous power output value, increasing 854 a duty cycle of the buck-boost power stage by a first delta value, and based on a determination that the power output value is not greater than the previous power output value, decreasing 856 the duty cycle of the buck-boost power stage by a second delta value.

In some examples, the power output value of the buck-boost power stage is the power output value of the power system. In some examples, a PDP controller is configured to configure the maximum power output of the buck-boost power stage regardless of an efficiency profile of the buck-boost power stage.

Figure 9:
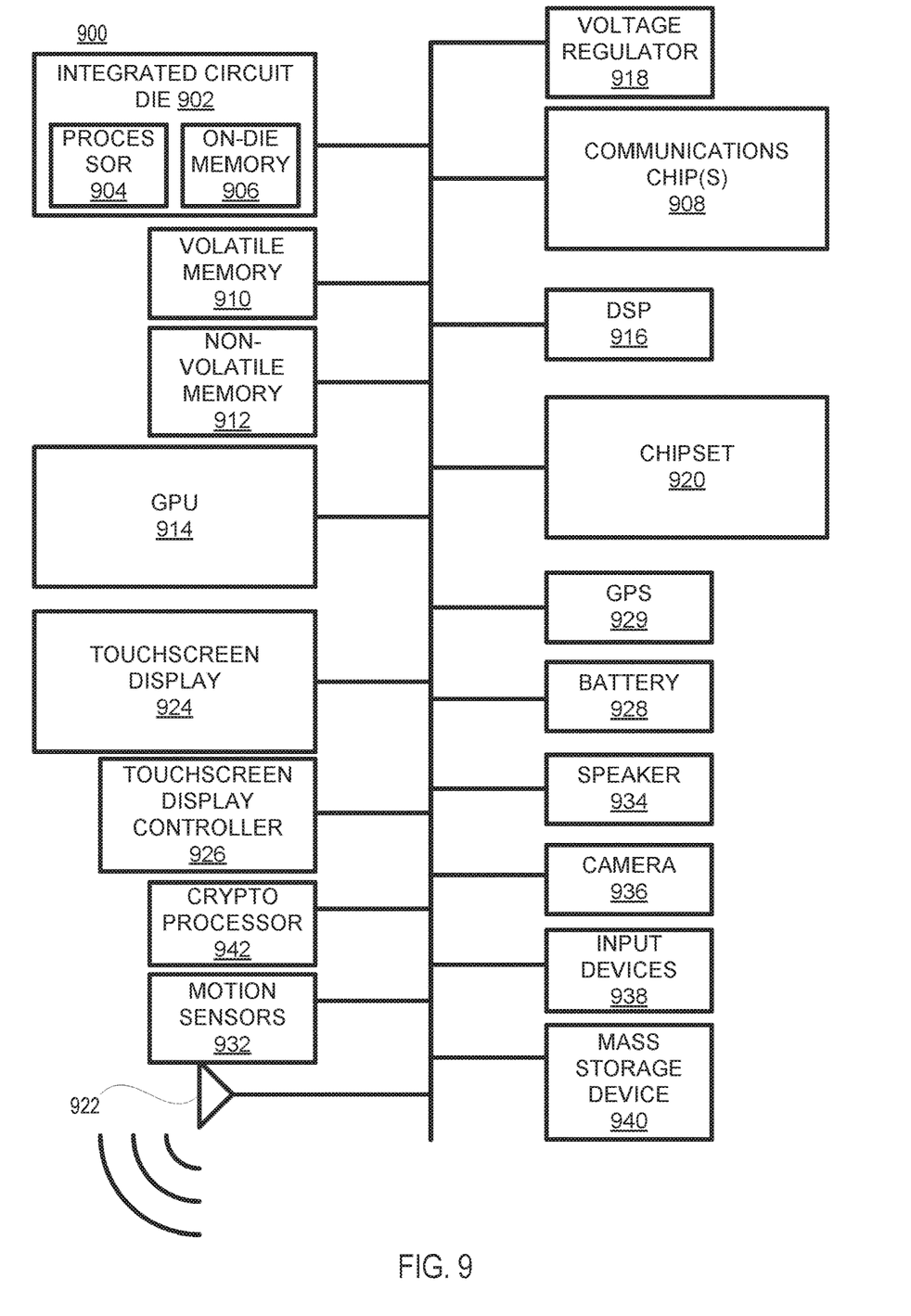
FIG. 9 is a block diagram illustrating an example computing device suitable for use to practice aspects of the present disclosure according to various embodiments.

FIG. 9 illustrates a computing device 900 in accordance with one embodiment of the invention. The computing device 900 may include a number of components. In one embodiment, these components are attached to one or more motherboards. In an alternate embodiment, some or all of these components are fabricated onto a single system-on-a- chip (SoC) die, such as an SoC used for mobile devices. The components in the computing device 900 include, but are not limited to, an integrated circuit die 902 and at least one communications logic unit 908. In some implementations the communications logic unit 908 is fabricated within the integrated circuit die 902, while in other implementations the communications logic unit 908 is fabricated in a separate integrated circuit chip that may be bonded to a substrate or motherboard that is shared with or electronically coupled to the integrated circuit die 902. The integrated circuit die 902 may include a processor 904 as well as on-die memory 906, often used as cache memory, that can be provided by technologies such as embedded DRAM (eDRAM), SRAM, or spin-transfer torque memory (STT-MRAM).

The computing device 900 may include other components that may or may not be physically and electrically coupled to the motherboard or fabricated within an SoC die. These other components include, but are not limited to, volatile memory 910 (e.g., DRAM), non-volatile memory 912 (e.g., ROM or flash memory), a graphics processing unit 914 (GPU), a digital signal processor 916, a crypto processor 942 (e.g., a specialized processor that executes cryptographic algorithms within hardware), a chipset 920, at least one antenna 922 (in some implementations, two or more antenna may be used), a display or a touchscreen display 924, a touchscreen controller 926, a battery 928 or other power source, a power amplifier (not shown), a voltage regulator 918, a global positioning system (GPS) device 929, a compass (not shown), a motion coprocessor or sensors 932 (that may include an accelerometer, a gyroscope, and a compass), a microphone (not shown), a speaker 934, a camera 936, user input devices 938 (such as a keyboard, mouse, stylus, and touchpad), and a mass storage device 940 (such as hard disk drive, compact disk (CD), digital versatile disk (DVD), and so forth). The computing device 900 may incorporate further transmission, telecommunication, or radio functionality not already described herein. In some implementations, the computing device 900 includes a radio that is used to communicate over a distance by modulating and radiating electromagnetic waves in air or space. In further implementations, the computing device 900 includes a transmitter and a receiver (or a transceiver) that is used to communicate over a distance by modulating and radiating electromagnetic waves in air or space.

The communications logic unit 908 enables wireless communications for the transfer of data to and from the computing device 900. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communications logic unit 908 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Infrared (IR), Near Field Communication (NFC), Bluetooth, and derivatives thereof, as well as any other wireless protocols that are designated as 3G, 4G, 5G, and beyond. The computing device 900 may include a plurality of communications logic units 908. For instance, a first communications logic unit 908 may be dedicated to shorter-range wireless communications such as Wi-Fi, NFC, and Bluetooth, and a second communications logic unit 908 may be dedicated to longer-range wireless communications such as GPS, EDGE, GPRS, CDMA, WiMAX, LTE, Ev-DO, and others.

The processor 904 of the computing device 900 includes one or more devices, such as transistors or metal interconnects, that are formed in accordance with embodiments of the invention. The term "processor" may refer to any device or portion of a device that processes electronic data from registers and/or memory to transform that electronic data into other electronic data that may be stored in registers and/or memory.

The communications logic unit 908 may also include one or more devices, such as transistors or metal interconnects, that are formed in accordance with embodiments of the invention.

In further embodiments, another component housed within the computing device 900 may contain one or more devices, such as transistors or metal interconnects, that are formed in accordance with implementations of the invention.

In various embodiments, the computing device 900 may be a laptop computer, a netbook computer, a notebook computer, an ultrabook computer, a smartphone, a dumbphone, a tablet, a tablet/laptop hybrid, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computing device 900 may be any other electronic device that processes data.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize.

The terminology used herein is for the purpose of describing particular embodiments only and is not intended to be limiting of the disclosure. As used herein, the singular forms "a," "an," and "the" are intended to include plural forms as well, unless the context clearly indicates otherwise. It will be further understood that the terms "comprises" and/or "comprising," when used in this specification, are specific to the presence of stated features, integers, steps, operations, elements, and/or components, but do not preclude the presence or addition of one or more other features, integers, steps, operation, elements, components, and/or groups thereof.

Embodiments may be implemented as a computer process, a computing system, or an article of manufacture such as a computer program product of computer-readable media. The computer program product may be a computer storage medium readable by a computer system and encoding computer program instructions for executing a computer process.

The corresponding structures, materials, acts, and equivalents of all means or steps plus function elements in the claims below are intended to include any structure, material, or act for performing the function in combination with other claimed elements that are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated. Thus various example embodiments of the present disclosure have been described including, but are not limited to:

Example 1 is a peak-delivered-power (PDP) controller. The peak-delivered-power (PDP) controller includes memory to store a previous power output value and a new power output value, and measurement circuitry to measure an output voltage value and an output current value after a buck-boost power stage of a voltage regulator. The peak-delivered-power (PDP) controller includes control circuitry to calculate the new power output value from the output voltage value and the output current value, and determine whether the new power output value is greater than the previous power output value to determine whether the voltage regulator is outputting a maximum power output. The peak-delivered-power (PDP) controller includes control circuitry to based on a determination that the new power output value is greater than the previous power output value, provide an instruction to a duty generator to increase a duty cycle of the voltage regulator, and based on a determination that the new power output value is not greater than the previous power output value. The peak-delivered-power (PDP) controller includes control circuitry to provide an instruction to the duty generator to decrease the duty cycle of the voltage regulator, and replace the previous power output value with the new power output value.

Example 2 is the PDP controller of Example 1, where the measurement circuitry to measure the output voltage value and the output current value is further designed to receive the output voltage value and the output current value in a digital format.

Example 3 is the PDP controller of Example 2, where the measurement circuitry to receive the output voltage value and the output current value in the digital format is further designed to receive the output voltage value and the output current value from an analog-to-digital converter (ADC).

Example 4 is the PDP controller of Example 1, where the measurement circuitry to measure the output voltage value and the output current value is further designed to receive an output voltage and an output current in an analog format.

Example 5 is the PDP controller of Example 4, where the measurement circuitry to receive the output voltage and the output current is designed to receive the output voltage and the output current from one of a buck stage, a boost stage, and a buck-boost stage.

Example 6 is the PDP controller of Example 1, where the control circuitry to calculate the new power output value is further designed to multiply the output current value by the output voltage value to calculate the new power output value.

Example 7 is the PDP controller of Example 1, where a multiplication operation used to multiply the output current value by the output voltage value is an analog multiplication operation.

Example 8 is the PDP controller of Example 1, where a multiplication operation used to multiply the output current value by the output voltage value is a digital multiplication operation.

Example 9 is the PDP controller of Example 1, where the control circuitry is further to, based on replacing the previous power output value with the new power output value: calculate the new power output value from a new output voltage value and a new output current value, determine whether the new power output value is greater than the previous power output value to determine whether the voltage regulator is currently outputting the maximum power output, based on the determination that the new power output value is greater than the previous power output value, provide an indication to the duty generator to increase the duty cycle, based on the determination that the new power output value is not greater than the previous power output value, provide the indication to the duty generator to decrease the duty cycle, and replace the previous power output value with the new power output value.

Example 10 is a buck-boost regulator. The buck-boost regulator includes a buck-boost power stage to receive a voltage input and a current input, and enable one of a buck mode and a boost mode to generate and provide an output voltage and an output current, from the voltage input and the current input, to an output capacitor. The buck-boost regulator includes a buck-boost power stage to a peak-delivered-power (PDP) controller to measure a power output value of the buck-boost power stage from the output voltage and the output current, and determine whether the power output value is greater than a previous power output value to determine whether a voltage regulator is outputting a maximum power output. The buck-boost regulator includes a buck-boost power stage to a peak-delivered-power (PDP) controller to based on a determination that the power output value is greater than the previous power output value, provide a first instruction to a duty generator to increase a duty cycle, and based on a determination that the power output value is not greater than the previous power output value, provide a second instruction to the duty generator to decrease the duty cycle. The buck-boost regulator includes a buck-boost power stage to a peak-delivered-power (PDP) controller to the duty generator to: receive the first instruction and the second instruction, based on receipt of the first instruction, increase the duty cycle of the buck-boost power stage by a first delta value, and based on receipt of the second instruction, decrease the duty cycle of the buck-boost power stage by a second delta value.

Example 11 is the buck-boost regulator of Example 10, where the first delta value is a predetermined first delta value.

Example 12 is the buck-boost regulator of Example 11, where the duty generator to increase the duty cycle is further designed to increase the duty cycle by the first delta value that is constant.

Example 13 is the buck-boost regulator of Example 10, where the second delta value is a predetermined second delta value.

Example 14 is the buck-boost regulator of Example 13, where the duty generator to decrease the duty cycle is further designed to decrease the duty cycle by the second delta value that is constant.

Example 15 is the buck-boost regulator of Example 10, where the duty generator designed to increase the duty cycle is further designed to calculate the first delta value based on a difference between the power output value and the previous power output value.

Example 16 is the buck-boost regulator of Example 10, where the duty generator to decrease the duty cycle is further designed to calculate the second delta value based on a difference between the power output value and the previous power output value.

Example 17 is the buck-boost regulator of Example 10, further including an analog-to-digital converter to convert the output voltage and the output current from an analog format to a digital format to generate an output voltage value and an output current value, and provide the output voltage value and the output current value in the digital format to the PDP controller.

Example 18 is a power system. The power system includes an energy transducer to generate a voltage input and a current input. The power system includes a buck-boost power stage to receive the voltage input and the current input, and enable one of a buck mode and a boost mode to generate and provide an output voltage and an output current, from the voltage input and the current input, to a capacitor. The power system includes the capacitor to receive the output voltage and the output current. The power system includes a peak-delivered-power (PDP) controller to determine a power output value based on the output voltage and the output current of the buck-boost power stage, and determine whether the power output value is greater than a previous power output value to determine whether a power output of the buck-boost power stage is a maximum power output of the buck-boost power stage. The power system includes a duty generator to based on a determination that the power output value is greater than the previous power output value, increase a duty cycle of the buck-boost power stage by a first delta value, and based on a determination that the power output value is not greater than the previous power output value, decrease the duty cycle of the buck-boost power stage by a second delta value.

Example 19 is the power system of Example 18, where the power output value of the buck-boost power stage is the power output value of the power system.

Example 20 is the power system of Example 18, where the PDP controller is further designed to configure the maximum power output of the buck-boost power stage regardless of an efficiency profile of the buck-boost power stage.

Example 21 is a method for a peak-delivered-power (PDP) controller. The method includes calculating a new power output value from an output voltage value and an output current value, and determining whether the new power output value is greater than a previous power output value to determine whether a voltage regulator is outputting a maximum power output. The method includes based on a determination that the new power output value is greater than the previous power output value, providing an instruction to a duty generator to increase a duty cycle of the voltage regulator, based on a determination that the new power output value is not greater than the previous power output value, providing an instruction to the duty generator to decrease the duty cycle of the voltage regulator, and replacing the previous power output value with the new power output value.

Example 22 is the method of Example 21, and further includes receiving the output voltage value and the output current value in a digital format.

Example 23 is the method of Example 22, where receiving the output voltage value and the output current value in the digital format further includes receiving the output voltage value and the output current value from an analog-to-digital converter (ADC).

Example 24 is the method of Example 21, further includes receiving an output voltage and an output current in an analog format.

Example 25 is the method of Example 24, where receiving the output voltage and the output current further includes receiving the output voltage and the output current from one of a buck stage, a boost stage, and a buck-boost stage.

Example 26 is the method of Example 21, where calculating the new power output value further includes multiplying the output current value by the output voltage value to calculate the new power output value.

Example 27 is the method of Example 21, where a multiplication operation used to multiply the output current value by the output voltage value is an analog multiplication operation.

Example 28 is the method of Example 21, where a multiplication operation used to multiply the output current value by the output voltage value is a digital multiplication operation.

Example 29 is the method of Example 21, and further includes, based on replacing the previous power output value with the new power output value: calculating the new power output value from a new output voltage value and a new output current value, determining whether the new power output value is greater than the previous power output value to determine whether the voltage regulator is currently outputting the maximum power output, based on the determination that the new power output value is greater than the previous power output value, providing an indication to the duty generator to increase the duty cycle, based on the determination that the new power output value is not greater than the previous power output value, providing the indication to the duty generator to decrease the duty cycle, and replacing the previous power output value with the new power output value.

Example 30 is a method for a buck-boost regulator. The method includes receiving, at a buck-boost power stage, a voltage input and a current input, enabling, by the buck-boost power stage, one of a buck mode and a boost mode to generate and provide an output voltage and an output current, from the voltage input and the current input, to an output capacitor. and measuring, at a peak-delivered-power (PDP) controller, a power output value of the buck-boost power stage from the output voltage and the output current. The method includes determining, at the PDP controller, whether the power output value is greater than a previous power output value to determine whether a voltage regulator is outputting a maximum power output, based on a determination that the power output value is greater than the previous power output value, providing, at the PDP controller, a first instruction to a duty generator to increase a duty cycle, and based on a determination that the power output value is not greater than the previous power output value, providing, at the PDP controller, a second instruction to the duty generator to decrease the duty cycle. The method includes receiving, at the duty generator, the first instruction and the second instruction, based on receipt of the first instruction, increasing, at the duty generator, the duty cycle of the buck-boost power stage by a first delta value, and based on receipt of the second instruction, decreasing, at the duty generator, the duty cycle of the buck-boost power stage by a second delta value.

Example 31 is the method of Example 30, where the first delta value is a predetermined first delta value.

Example 32 is the method of Example 31, where increasing the duty cycle further includes increasing the duty cycle by the first delta value that is constant.

Example 33 is the method of Example 30, where the second delta value is a predetermined second delta value.

Example 34 is the method of Example 33, where decreasing the duty cycle further includes decreasing the duty cycle by the second delta value that is constant.

Example 35 is the method of Example 30, where increasing the duty cycle further includes calculating the first delta value based on a difference between the power output value and the previous power output value.

Example 36 is the method of Example 30, where decreasing the duty cycle further includes calculating the second delta value based on a difference between the power output value and the previous power output value.

Example 37 is the method of Example 30, further includes converting the output voltage and the output current from an analog format to a digital format to generate an output voltage value and an output current value, and providing the output voltage value and the output current value in the digital format to the PDP controller.

Example 38 is a method for a power system. The method includes receiving a voltage input and a current input, enabling one of a buck mode and a boost mode to generate and provide an output voltage and an output current, from the voltage input and the current input, to a capacitor, and determining a power output value based on the output voltage and the output current of a buck-boost power stage of the power system. The method includes determining whether the power output value is greater than a previous power output value to determine whether a power output of the buck-boost power stage is a maximum power output of the buck-boost power stage, based on a determination that the power output value is greater than the previous power output value, increasing a duty cycle of the buck-boost power stage by a first delta value, and based on a determination that the power output value is not greater than the previous power output value, decreasing the duty cycle of the buck-boost power stage by a second delta value.

Example 39 is the method of Example 38, where the power output value is the power output value of the power system.

Example 40 is the method of Example 38, further includes configuring the maximum power output regardless of an efficiency profile of the buck-boost power stage.

Example 41 is at least one computer-readable storage medium having stored thereon computer-readable instructions, when executed, to implement a method as exemplified in any of Examples 21-40.

Example 42 is an apparatus including a manner to perform a method as exemplified in any of Examples 21-40.

Example 43 is a manner for performing a method as exemplified in any of Examples 21-40.

It will be understood by those skilled in the art that many changes may be made to the details of the above-described embodiments without departing from the underlying principles of the invention. The scope of the present invention should, therefore, be determined only by the following claims.

The invention claimed is:

1. A peak-delivered-power (PDP) controller, comprising:
   memory to store a previous power output value and a new power output value, wherein the previous power output value and the new power output value correspond with power after a buck-boost power stage of a voltage regulator at a first time and a second time respectively;
   measurement circuitry to measure an output voltage value and an output current value after the buck-boost power stage of the voltage regulator; and
   control circuitry to:
      calculate the new power output value after the buck-boost power stage from the output voltage value and the output current value;
      determine whether the new power output value after the buck-boost power stage is greater than the previous power output value after the buck-boost power stage to determine whether the voltage regulator is outputting a maximum power output;
      based on a determination that the new power output value after the buck-boost power stage is greater than the previous power output value after the buck-boost power stage, provide an instruction to a duty generator to increase a duty cycle of the voltage regulator;
      based on a determination that the new power output value after the buck-boost power stage is not greater than the previous power output value after the buck-boost power stage, provide an instruction to the duty generator to decrease the duty cycle of the voltage regulator; and
      replace the previous power output value with the new power output value.

2. The PDP controller of claim 1, wherein the measurement circuitry to measure the output voltage value and the output current value is further configured to receive the output voltage value and the output current value in a digital format.

3. The PDP controller of claim 2, wherein the measurement circuitry to receive the output voltage value and the output current value in the digital format is further configured to receive the output voltage value and the output current value from an analog-to-digital converter (ADC).

4. The PDP controller of claim 1, wherein the measurement circuitry to measure the output voltage value and the output current value is further configured to receive an output voltage and an output current in an analog format.

5. The PDP controller of claim 4, wherein the measurement circuitry to receive the output voltage and the output current is configured to receive the output voltage and the output current from one of a buck stage, a boost stage, and a buck-boost stage.

6. The PDP controller of claim 1, wherein the control circuitry to calculate the new power output value is further configured to multiply the output current value by the output voltage value to calculate the new power output value.

7. The PDP controller of claim 1, wherein a multiplication operation used to multiply the output current value by the output voltage value is an analog multiplication operation.

8. The PDP controller of claim 1, wherein a multiplication operation used to multiply the output current value by the output voltage value is a digital multiplication operation.

9. The PDP controller of claim 1, wherein the control circuitry is further to, based on replacing the previous power output value with the new power output value:
   calculate the new power output value from a new output voltage value and a new output current value;
   determine whether the new power output value is greater than the previous power output value to determine whether the voltage regulator is currently outputting the maximum power output;
   based on the determination that the new power output value is greater than the previous power output value, provide an indication to the duty generator to increase the duty cycle;
   based on the determination that the new power output value is not greater than the previous power output value, provide the indication to the duty generator to decrease the duty cycle; and
   replace the previous power output value with the new power output value.

10. A buck-boost regulator, comprising:
    a buck-boost power stage to:
       receive a voltage input and a current input; and enable one of a buck mode and a boost mode to generate and provide an output voltage and an output current, from the voltage input and the current input, to an output capacitor;

a peak-delivered-power (PDP) controller to:
measure a power output value of the buck-boost power stage from the output voltage and the output current;
determine whether the power output value after the buck-boost power stage is greater than a previous power output value after the buck-boost power stage to determine whether a voltage regulator is outputting a maximum power output;
based on a determination that the power output value after the buck-boost power stage is greater than the previous power output value after the buck-boost power stage, provide a first instruction to a duty generator to increase a duty cycle; and
based on a determination that the power output value after the buck-boost power stage is not greater than the previous power output value after the buck-boost power stage, provide a second instruction to the duty generator to decrease the duty cycle; and the duty generator to:
receive the first instruction and the second instruction;
based on receipt of the first instruction, increase the duty cycle of the buck-boost power stage by a first delta value; and
based on receipt of the second instruction, decrease the duty cycle of the buck-boost power stage by a second delta value.

11. The buck-boost regulator of claim 10, wherein the first delta value is a predetermined first delta value.

12. The buck-boost regulator of claim 11, wherein the duty generator to increase the duty cycle is further configured to increase the duty cycle by the first delta value that is constant.

13. The buck-boost regulator of claim 10, wherein the second delta value is a predetermined second delta value.

14. The buck-boost regulator of claim 13, wherein the duty generator to decrease the duty cycle is further configured to decrease the duty cycle by the second delta value that is constant.

15. The buck-boost regulator of claim 10, wherein the duty generator configured to increase the duty cycle is further configured to:
calculate the first delta value based on a difference between the power output value and the previous power output value.

16. The buck-boost regulator of claim 10, wherein the duty generator to decrease the duty cycle is further configured to:

calculate the second delta value based on a difference between the power output value and the previous power output value.

17. The buck-boost regulator of claim 10, further comprising an analog-to-digital converter to:
convert the output voltage and the output current from an analog format to a digital format to generate an output voltage value and an output current value; and
provide the output voltage value and the output current value in the digital format to the PDP controller.

18. A power system, comprising:
an energy transducer to generate a voltage input and a current input;
a buck-boost power stage to:
receive the voltage input and the current input; and
enable one of a buck mode and a boost mode to generate and provide an output voltage and an output current, from the voltage input and the current input, to a capacitor;
the capacitor to receive the output voltage and the output current;
a peak-delivered-power (PDP) controller to:
determine a power output value after the buck-boost power stage based on the output voltage and the output current of the buck-boost power stage; and
determine whether the power output value after the buck-boost power stage is greater than a previous power output value after the buck-boost power stage to determine whether a power output of the buck-boost power stage is a maximum power output of the buck-boost power stage; and
a duty generator to:
based on a determination that the power output value after the buck-boost power stage is greater than the previous power output value after the buck-boost power stage, increase a duty cycle of the buck-boost power stage by a first delta value; and
based on a determination that the power output value after the buck-boost power stage is not greater than the previous power output value after the buck-boost power stage, decrease the duty cycle of the buck-boost power stage by a second delta value.

19. The power system of claim 18, wherein the power output value of the buck-boost power stage is the power output value of the power system.

20. The power system of claim 18, wherein the PDP controller is further configured to configure the maximum power output of the buck-boost power stage regardless of an efficiency profile of the buck-boost power stage.

* * * * *